US012367034B2

(12) United States Patent
Chibon et al.

(10) Patent No.: US 12,367,034 B2
(45) Date of Patent: Jul. 22, 2025

(54) PROVIDING ACCESS TO METADATA MODIFICATIONS TO FACILITATE SOFTWARE BUILD REPRODUCTION

(71) Applicant: RED HAT, INC., Raleigh, NC (US)

(72) Inventors: Pierre-Yves Chibon, Saint-Pol-de-Leon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 217 days.

(21) Appl. No.: 18/113,659

(22) Filed: Feb. 24, 2023

(65) Prior Publication Data

US 2024/0289123 A1    Aug. 29, 2024

(51) Int. Cl.
*G06F 8/71* (2018.01)
*G06F 8/36* (2018.01)

(52) U.S. Cl.
CPC . *G06F 8/71* (2013.01); *G06F 8/36* (2013.01)

(58) Field of Classification Search
CPC ................................ G06F 8/71; G06F 8/36
USPC ........................................................ 717/170
See application file for complete search history.

(56) References Cited

U.S. PATENT DOCUMENTS

| 8,347,263 | B1 | 1/2013 | Offer | |
|---|---|---|---|---|
| 8,630,981 | B1* | 1/2014 | Chirhart | G06F 8/658 |
| | | | | 707/625 |
| 8,863,114 | B2* | 10/2014 | Shah | G06F 8/60 |
| | | | | 717/175 |
| 9,116,899 | B2* | 8/2015 | Cullen | G06F 8/65 |
| 9,448,780 | B1* | 9/2016 | Hall | G06F 8/61 |
| 9,678,737 | B2* | 6/2017 | Wei | H04L 67/34 |
| 9,753,929 | B2* | 9/2017 | Clemm | G06F 16/2445 |
| 10,528,537 | B2* | 1/2020 | McHugh | G06F 16/172 |
| 10,545,737 | B2 | 1/2020 | Puszkiewicz et al. | |
| 11,106,626 | B2* | 8/2021 | Cullen | G06F 16/11 |
| 11,144,438 | B1* | 10/2021 | Teixeira | G06F 8/658 |
| 11,301,217 | B1* | 4/2022 | Gezen | G06F 8/63 |
| 11,586,436 | B1* | 2/2023 | Jennings | G06F 8/61 |
| 12,032,953 | B2* | 7/2024 | Rathinagiri | G06F 8/656 |
| 12,067,392 | B2* | 8/2024 | Starr | G06F 8/447 |
| 12,124,406 | B2* | 10/2024 | Singh | G06F 16/1865 |
| 2013/0174124 | A1* | 7/2013 | Watters | G06F 8/71 |
| | | | | 717/122 |

(Continued)

OTHER PUBLICATIONS

RTEMS User Manual, https://docs.rtems.org/releases/rtems-5.1/user.pdf, Aug. 26, 2020; pp. 1-343.

(Continued)

*Primary Examiner* — Francisco J Aponte
(74) *Attorney, Agent, or Firm* — Kilpatrick Townsend & Stockton LLP

(57) ABSTRACT

Software builds can be constructed based on previously recorded modifications to metadata. For example, a computing device can record modification logs. Each of the modification logs can be associated with a modification to metadata for a software repository. The computing device can also receive, from a client device, a request for the metadata for the software repository at a particular time. The computing device can provide access, for the client device, to one or more modification logs of the modification logs associated with the particular time. The one or more modification logs can be used by the client device to produce a software build having characteristics of the metadata at the particular time.

14 Claims, 3 Drawing Sheets

(56) References Cited

U.S. PATENT DOCUMENTS

| | | | | |
|---|---|---|---|---|
| 2015/0100945 A1* | 4/2015 | Nadar | G06F 8/40 | 717/121 |
| 2015/0363195 A1* | 12/2015 | Schlueter | G06F 8/60 | 717/121 |
| 2016/0259795 A1* | 9/2016 | Brandys | G06F 40/197 | |
| 2017/0262268 A1* | 9/2017 | Godowski | G06F 8/61 | |
| 2018/0060065 A1* | 3/2018 | Lai | G06F 8/71 | |
| 2018/0260206 A1* | 9/2018 | Pandey | G06F 8/62 | |
| 2019/0286438 A1* | 9/2019 | Bregman | H04L 67/34 | |
| 2019/0303138 A1* | 10/2019 | Szulman | G06F 16/192 | |
| 2021/0149682 A1* | 5/2021 | Muthu | G06F 8/71 | |
| 2023/0185559 A1* | 6/2023 | Landman | G06F 8/71 | 717/171 |
| 2024/0037236 A1* | 2/2024 | Duprez | G06F 8/65 | |
| 2024/0045786 A1* | 2/2024 | Bell | G06F 8/71 | |
| 2024/0289123 A1* | 8/2024 | Chibon | G06F 8/71 | |

OTHER PUBLICATIONS

"Repositories and Sources," https://docs.rstudio.com/rspm/1.2.0/admin/repositories/, 2022; 1-18.

"Git-Build-Rpm," https://github.com/iovation/git-build-rpm, 2022; pp. 1-4.

"Git Basics—Recording Changes to the Repository", https://git-scm.com/book/id/v2/Git-Basics-Recording-Changes-to-the-Repository, 2022; pp. 4-12.

Prett, D., "Introduction to RPM Packaging", https://documentation-suse.com/sbp/all/html/SBP-RPM-Packaging/index.html, May 29, 2017; pp. 1-33.

* cited by examiner

PROVIDING ACCESS TO METADATA MODIFICATIONS TO FACILITATE SOFTWARE BUILD REPRODUCTION

TECHNICAL FIELD

The present disclosure relates generally to software repositories and, more particularly (although not necessarily exclusively), to providing access to metadata modifications to facilitate software build reproduction.

BACKGROUND

It has become commonplace for developers to continue to develop and provide updates for (e.g., new versions of) software over time. For example, developers may provide updates overtime that add features to the software or remove existing features from the software. New software may also be created that has similar functionality to older software. A user may wish to replace the existing software in a computing environment with such updates or new software. The software can be built and updated using software packages stored in a software repository. The software repository can additionally include metadata about the software packages installed, the order of installation, dependencies used, environmental variables, and any other details regarding the software build. In some cases, the software repository may include metadata regarding package manager files that store installation packages. One example of such package manager files includes Red Hat™ Package Manager (RPM) files for storing installation packages on Linux operating systems.

DETAILED DESCRIPTION

Figure 1:
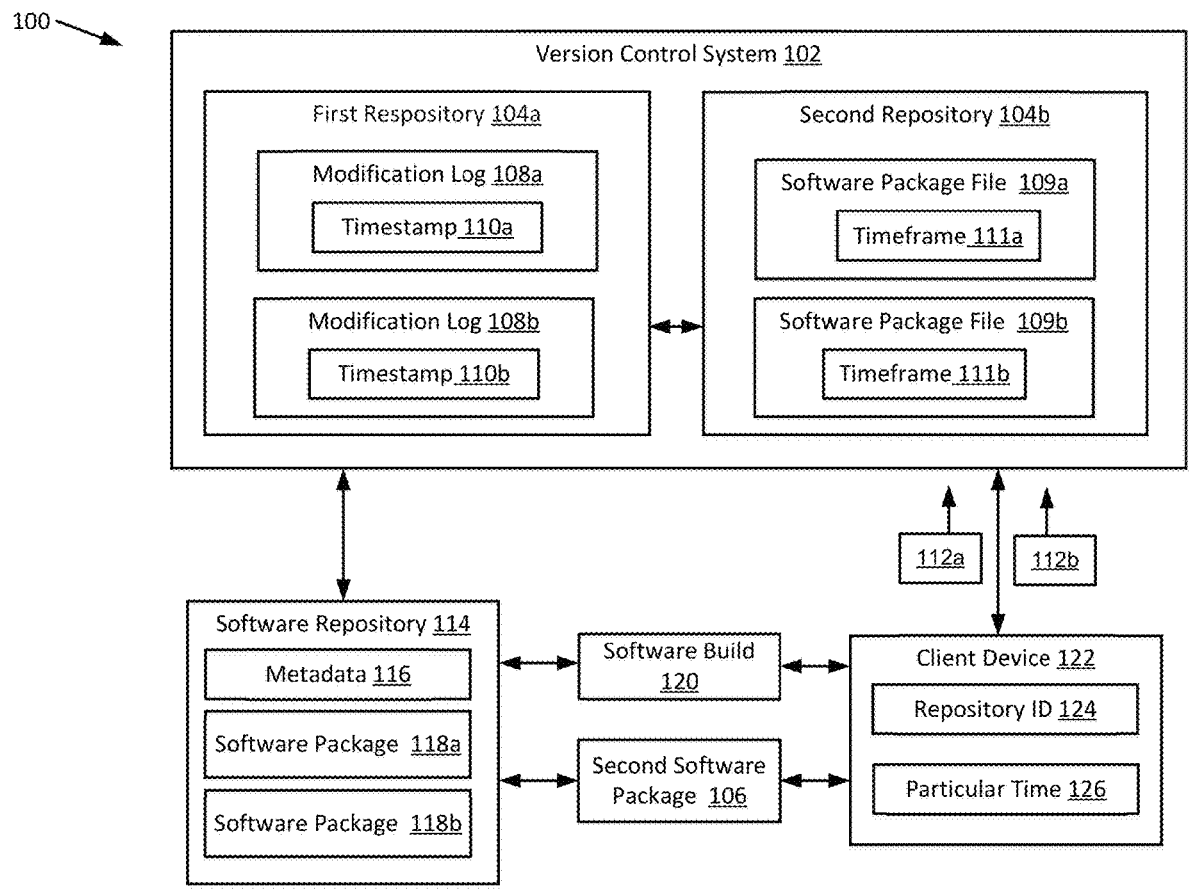
FIG. 1 is a block diagram of an example of a system for providing access to metadata modifications to facilitate software build reproduction according to one example of the present disclosure.

There are a number of industries and applications that may require the ability to access necessary information for reproducing a software build, especially at a particular point in time. These requirements may be driven by audits, quality assurance testing, or root cause analysis to determine a source of an issue. In some cases, build systems may not keep records of previous software builds. And, while some build systems may keep copies of previous software builds, it may be difficult or impossible for client devices to access the build system to retrieve such copies. Client devices with limited or no access to the build system may be unable to determine, for example, the root cause of an issue with a software build at a particular point in time. Additionally, systems that do store copies of previous software builds, such as local mirrors, may not record copies at frequent enough intervals to allow a client device to exactly replicate a version of the software build. For example, the systems may not record metadata, which can define characteristics of a software build at a particular time, at a frequent enough interval, thereby preventing replication of the software build. In another example, the systems may not record a certain version of a software package that was installed for the software build at the particular time, which may also prevent replication of the software build. There can also be storage constraints on the systems that cause the systems to periodically remove the previous versions of software packages or other information necessary for reproducing software builds.

Some examples of the present disclosure can overcome one or more of the abovementioned problems via a system that can record modification logs associated with metadata for a software repository. The modification logs associated with the metadata can denote updates to the software repository, which can be useful for recreating a software build from a particular time (e.g., from several months ago) using the software repository. In some examples, the system can also record modification logs for metadata updates reflective of updates to software packages, which can be used to produce previous versions of the software packages. It may be necessary to install or otherwise use the previous versions of the software packages when recreating the software build or when analyzing an issue with the software build.

Additionally, client devices may transmit requests for metadata at the particular time, and the system can determine and transmit modification logs associated with the particular time. In this way, the system can provide access for the client devices to modifications to the metadata that occurred at or near the particular time. The client devices can use the modification logs to determine characteristics of the metadata at the particular time and, based on the characteristics, the client devices can reproduce the software build for the particular time. Thus, the system can enable reproduction of any version of a software build over a timeframe for which there are modification logs. The system can further enable software build reproduction without the client devices directly accessing build systems to improve security for the build systems. Additionally, the storage of modification logs in, for example, a Git repository can be more efficient than storage of previous versions of software builds or software packages.

In one particular example, a software repository may store software package files that include metadata describing the contents of the software package files. One example of a software package file is a Red Hat™ Package Manager (RPM) file. A version control system, such as, but not limited to Global Information Tracking (Git), Mercurial, or Bazaar, can record modification logs for the software repository, where each of the modification logs may include a modification to the metadata and a timestamp for the modification. Additionally, an incident may occur in a heavily regulated industry, such as the automotive industry, that may require analysis of exact software build conditions and state from a time of the incident. Therefore, a client device may transmit a request for metadata at the time of the incident to the version control system.

In response to receiving the request, the version control system may provide access for the client device to one or more modification logs recorded closest to the time of the incident. For example, if a first modification log was recorded with a first timestamp of Feb. 27, 2022 at 4:54 PM and a second modification log was recorded at a second timestamp of Mar. 1, 2022 at 4:54 PM, and the incident occurred on Feb. 28, 2022 at 5:00 PM, the version control system may provide access for the client device to the first and second modification logs. Additionally, the client device may use modifications indicated by the first and second modification logs to produce a software build having characteristics of the metadata at the time of the incident. For example, the client device may generate RPM files based on the modification logs, and then generate a software build from the RPM files to replicate the exact software build in use at the time of the incident.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for providing access to metadata modifications to facilitate software build reproduction according to one example of the present disclosure. The system 100 can include a software repository 114, a version control system 102, a client device 122, and a software build 120 associated with the software repository 114. Examples of the client device 122 can include a server, a laptop computer, a desktop computer, a phone, other suitable device, or any combination of these. Additionally, examples of the version control system 102 can include a Git control system, a Subversion (SVN) control system, a Mercurial control system, a Bazaar control system, a Centralized Version Control system (CVS), or another suitable system or technique for storing and organizing modifications to metadata, computer programs, computer files, etc.

The software repository 114 can include metadata 116. In some examples, the metadata can include licensing information for the software repository 114, vendor information (i.e., build system information), software build information, or other suitable information. The metadata 116 can further describe contents of software packages 118a-b stored in the software repository 114. For example, the metadata 116 include package names, package descriptions, package versions, dependencies (i.e., software packages that need to be installed in conjunction with the software packages 118a-b), other suitable information, or a combination thereof. In some examples, the software packages 118a-b can be different versions of the same software package where a first software package 118a can be an updated version of a second software package 118b. The first software package 118a can therefore be associated with an update to the software build 120.

In an example, a state of the software repository 114 may change due to changes to the software build 120, such as due to the update to the first software package 118a. The changes to the software build 120 may further include an addition of a software package, removal of a software package, or other suitable changes with respect to the software packages associated with the software build 120. Additionally, the metadata 116 may be modified to reflect the changes to the software build 120. For each modification to the metadata 116, the version control system 102 can record modification logs. For example, the version control system 102 may record a first modification log 108a for a first modification to the metadata 116 and a second modification log 108b for a second modification to the metadata 116. The modification logs 108a-b can further include timestamps to indicate when the modifications occurred. For example, a first timestamp 110a of the first modification log 108a can indicate a first date and time of Jan. 8, 2023 at 10:00 AM. A second timestamp 110b of the second modification log 108b can indicate a second date and time of Jan. 10, 2023 at 3:30 PM.

Additionally, the modification logs 108a-b can be stored in a first repository 104a, which can be a version control system repository for storing and organizing modifications to metadata. For example, the first repository 104a can be a Git repository, a relational database, a SVN repository, a CVS repository, etc. The first repository 104a may also include related information such as related to the software build 120 or the software repository 114. For example, the related information may include a description of the software build 120 or of the software repository 114, a version of the software build 120 or of the software repository, etc. In a particular example in which the first repository 104a is a Git repository, the modification logs 108a-b can each be stored as a commit entry. The commit entry can include the modification to metadata, timestamp, other suitable information, or a combination thereof to enable efficient storage and access. Thus, the first repository 104a can include information indicative of a state the software repository 114 at any given point in time. Additionally, the first repository 104a may include all the information (i.e., the modification logs 108a-b, timestamps 110a-b, etc.) necessary to produce the software build 120 from any given point in time.

In the example, the version control system 102 may receive a first request 112a from the client device 122. The client device 122 may transmit the first request 112a in response to an issue with the software build 120 that occurred on Jan. $9^{th}$ at 5:00 PM. Therefore, the first request 112a can be a request for metadata 116 at a particular time 126 of Jan. $9^{th}$ at 5:00 PM. In some examples, the system 100 may include multiple software repositories, which may be associated with multiple software builds. In such examples, each software repository may be associated with a repository identification (ID). Thus, the first request 112a may further include a repository ID 124 for the software repository 114.

In response to the first request 112a, the version control system 102 may search the first repository 104a for modification logs associated with the particular time 126. For example, the first timestamp 110a can be a closest, preceding timestamp to the particular time 126 and the second timestamp 110b can be a closest, subsequent timestamp to the particular time 126. Thus, the modification logs 108a-b can be associated with the particular time and the version control system 102 can provide access for the client device 122 to the modification logs 108a-b. In some examples, the version control system 102 may automatically transmit the modification logs 108a-b to the client device 122. Additionally or alternatively, the client device 122 can download the first repository 104a from the version control system 102.

Then, the client device 122 can use the modification logs 108a-b to reproduce the software build 120 for the particular time 126. The software build 120 reproduced can have characteristics of the metadata 116 at the particular time 126 as indicated by the modification logs 108a-b. For example, the second modification log 108b can indicate that the update to the first software package 118a occurred after the particular time 126. Therefore, the client device 122 can install the second software package 118b when producing the software build 120 for the particular time 126. The software build 120 reproduced can be an exact replica of the software build 120 used at the particular time 126. As a result, the client device 122 can analyze the software build 120 to determine, for example, that a root cause of the issue was a bug in the second software package 118b.

Additionally or alternatively, the system 100 may remove previous versions of software packages from the software repository 114. For example, the software packages 118a-b can be the two most recent versions of a software package, and a third version of the software package preceding the software packages 118a-b may be removed from the software repository 114. Therefore, to reproduce the software build 120 for a timeframe during which the third version of the software package was installed, it may be necessary to reproduce the third version of the software package.

The metadata 116 can be updated to reflect updates to software packages. Therefore, there can be modification logs in the first repository 104a associated with the different versions of the software package. In some examples, the system 100 or the client device 122 may detect that the third version of the software package is no longer stored in the software repository 114. The third version of the software package may have been deployed in the software build 120 at the particular time 126. In response, the client device 122 can transmit a second request 112b for the third version of the software package to the version control system 102. The version control system 102 can provide one or more modification logs associated with the third version of the software package to the client device 122. The version control system 102 may provide the modification logs based on the modification logs including an indication of being associated with the third version of the software package, based on timestamps of the modification logs, or a combination thereof. The one or more modification logs may provide information about a state of the software build 120 at the particular time 126. The one or more modification logs can be used by the client device 122 to reproduce the third version of software package.

Additionally or alternatively, the version control system 102 may store software package files 109a or modification logs representing changes to software package files of the software packages 118a-b. The software packages 118a-b can include the software package files 109a-b. The software package files 109a-b may include metadata describing the corresponding software packages and may also include timeframes 111a-b to indicate when the corresponding software packages were deployed in the software build 120. For example, the second software package 118b can include a second software package file 109b having a second timeframe 111b indicating that the second software package 118b was deployed in the software build 120 from December $9^{th}$ at 8:00 PM to Jan. $9^{th}$ at 8:00 PM. Additionally, the first software package 109a can include a first software package file 109a having a first timeframe 111a indicating that the first software package 118b was deployed on Jan. $9^{th}$ at 8:01 PM and may still be in use. The software package files 109a-b can be stored in the first repository 104a or the software package files 109a-b can be stored in a second repository 104b. It can be desirable to store the software package files 10a-b in a separate repository from the modification logs 108a-b to improve efficiency of reproducing software builds. For example, the second repository 104b may be a software package file repository or an RPM repository. Thus, the software package files or RPM files can be accessed, downloaded, installed, or a combination thereof from the second repository 104b. Additionally or alternatively, the second repository 104b can be a Git repository, a relational database, a SVN repository, a CVS repository, etc. for storing and organizing various versions of software packages.

For example, in response to the second request 112b for the third version of the software package, the client device 122 may receive access to the second repository 104b. The client device 122 may determine that the third version of the software package was implemented in the software build 120 at the particular time 126 based on the timeframes 111a-b. Additionally, in the example, the client device 122 may be able to download the third version software package from a third software package file stored in the second repository 104b. Then, the third version of the software package can be used to reproduce the software build 120 at the particular time 126.

Although FIG. 1 shows a certain number and arrangement of components, this is intended to be illustrative and non-limiting. Other examples may include more components, fewer components, different components, or a different arrangement of components shown in FIG. 1. For instance, the software build 120 may be part of the version control system 102, the client device 122, or a separate device. Although the version control system 102 includes two Git repositories 104a-b and four modification logs 106a-d, any number of Git repositories can be created and any number of modification logs may be recorded. Additionally, the system 100 may include any number of software repositories 114 or client devices 122. Any suitable arrangement of the depicted components is contemplated herein.

Figure 2:
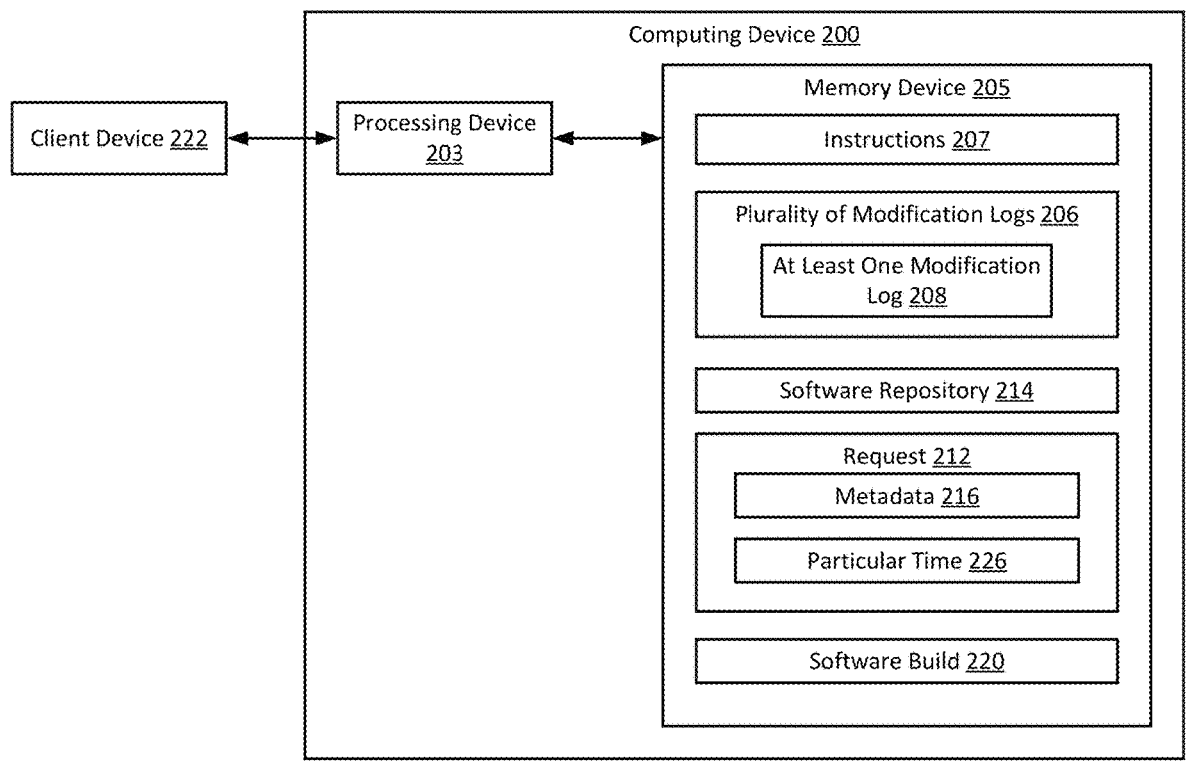
FIG. 2 is a block diagram of a computing device for providing access to metadata modifications to facilitate software build reproduction according to one example of the present disclosure.

FIG. 2 is a block diagram of a computing device 200 for providing access to metadata modifications to facilitate software build reproduction according to one example of the present disclosure. The computing device 200 can include a processing device 203 communicatively coupled to a memory device 205.

The processing device 203 can include one processing device or multiple processing devices. Non-limiting examples of the processing device 203 include a Field-Programmable Gate Array (FPGA), an application-specific integrated circuit (ASIC), a microprocessor, etc. The processing device 203 can execute instructions 207 stored in the memory device 205 to perform operations. In some examples, the instructions 207 can include processor-specific instructions generated by a compiler or an interpreter from code written in any suitable computer-programming language, such as C, C++, C #, etc. The instructions 207 can be, for example, program code for the version control system 102 of FIG. 1.

The memory device 205 can include one memory device or multiple memory devices. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. In some examples, at least some of the memory can include a medium from which the processing device 203 can read instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the memory device 205 can include one or more repositories for storing modification logs associated with various times. For example, a version control system repository can store a plurality of modification logs 206. The plurality of modification logs 206 may include modifications to metadata 216 for a software repository 214.

The modifications to the metadata 216 can be reflective of updates to software packages stored in the software repository 214 or other suitable changes to a software build 220 associated with the software repository 214. The plurality of modification logs 206 can also include timestamps for the modifications to the metadata 216.

In some examples, the instructions 207 may be executable by the processing device 203 for causing the processing device 203 to record the plurality of modification logs 206. The processing device 203 may also receive a request 212 for the metadata 216 for software repository 214 at a particular time 228 from a client device 222. The processing device 203 may further provide access, for the client device 222, to at least one modification log 208 of the plurality of modification logs 206 associated with the particular time 226. The at least one modification log 208 may be used by the client device 222 to produce a software build 220 having characteristics of the metadata 224 at the particular time 226.

Figure 3:
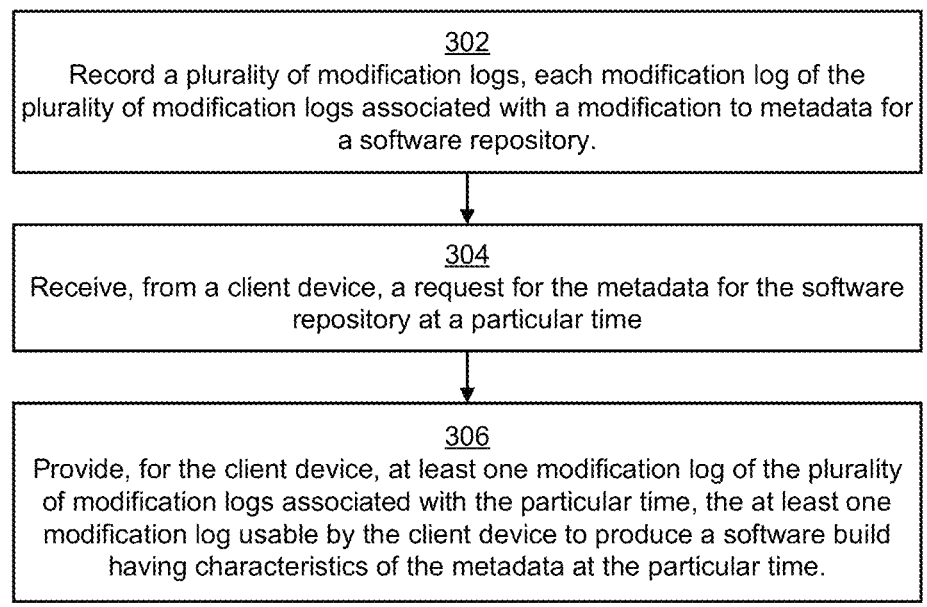
FIG. 3 is a flow chart of an example of a process for providing access to metadata modifications to facilitate software build reproduction according to one example of the present disclosure.

FIG. 3 is a flow chart of an example of a process for providing access to metadata modifications to facilitate software build reproduction according to one example of the present disclosure. In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 203 can record a plurality of modification logs, each modification log of the plurality of modification logs associated with a modification to metadata 116 for a software repository 114. In a particular example, a software build 120 may be generated using software packages stored in the software repository 114. The software build 120 may be used, such as by a client device 122, to generate edge images that are then shipped to remote locations. The processing device 202 may record a first modification log 108a based on metadata 116 for the software repository 114 used to generate a first edge image at a first time, represented by a first timestamp 110a. One day later, a software package in the software build 120 may be updated, and in response to the update, the processing device 203 may record a second modification log 108b capturing changes to the metadata 116 resulting from the update. The second modification log 108b can also have a second timestamp 110b.

Additionally, in some examples, the processing device 203 may store the modification logs 108a-b in a first repository 104a, which can be a version control system repository. The processing device 203 may also store software package files 109a-b in a second repository 104b, which can be a software package file repository. The software package files 109a-b can be part of software packages 118a-b and include timeframes 111a-b for which the software packages 118a-b were deployed in the software build 120.

At block 304, the processing device 202 can receive, from a client device 122, a request for the metadata 116 for the software repository 114 at a particular time 126. In some examples, the metadata request 118 may be received in response to an issue with a software build 120. For example, a second edge image generated using the software build 120 after the update may fail to boot for an unknown reason. To determine the source of the failed boot, the request sent by the client device 122 may request metadata 110 for the particular time 128 that the software build 120 was updated.

At block 306, the processing device 203 can provide, for the client device 122, at least one modification log of the plurality of modification logs associated with the particular time 126, the at least one modification log usable by the client device 122 to produce a software build 120 having characteristics of the metadata 116 at the particular time 126. The processing device 202 may determine the at least one modification log 208 is associated with the particular time 126 based on the timestamps included in the plurality of modification logs 206. In some examples, the processing device 203 may provide access by automatically transmitting the at least one modification log 208 to the client device 122. In other examples, the processing device 202 may provide access by enabling the client device 122 to download the version control system repository.

Additionally, in some examples, the processing device 203 may automatically generate the software build 120 having the characteristics of the metadata 116 at the particular time 126 based on the at least one modification log 208. Then, the processing device 203 can provide the software build 120 for use and analysis by the client device 122.

In the particular example, the processing device 203 can provide the client device 122 with access to the second modification log 108b recorded at the second timestamp 110b. Notably, the second modification log 108b can include information regarding the version of the software build 120 that was updated. The client device 122 can use the second modification log 108b to reproduce the updated version of the software build 120 for the particular time 126. The client device 122 may determine, based on the updated version of the software build 120, that the second edge image failed to boot because of a bug in the updated software package. The client device 122 may then determine that the updated software package should be replaced with the older version of the software package.

Additionally or alternatively, previous versions of software packages may be removed from the software repository 214. In the particular example the client device 122 may detect that the older version of the software package is no longer in the software repository 214. Thus, it may be necessary to reproduce the older version of the software package to produce the desirable version of the software build 120. As a result, the processing device 203 may receive, from the client device 122, a second request 112 for the older version of a software package. The processing device 203 can provide, for the client device 122, at least one modification log 208 of the plurality of modification logs 206 associated with the particular time and with the software package. The client device 122 can use the at least one modification log 208 to produce the older version of the software package, which can then be used to produce the desirable version of the software build. In another example, the client device 122 may be able to download the older version of the software package from the second repository 104b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
recording a plurality of modification logs, each modification log of the plurality of modification logs associated with a modification to metadata for a software repository;
storing, in a version control system repository, the plurality of modification logs;
receiving, from a client device, a request for the metadata for the software repository at a particular time;
providing access, for the client device, to at least one modification log of the plurality of modification logs associated with the particular time, the at least one modification log usable by the client device to produce a software build having characteristics of the metadata at the particular time;
storing, in a software package file repository, a plurality of software package files associated with the software build, each software package file of the plurality of software package files comprising a timeframe corresponding to deployment of a software package including the software package file in the software build; and
providing access for the client device to the software package file repository, the software package file repository usable by the client device to determine a version of the software package at the particular time based on the timeframe for each software package file and usable by the client device to download the version of the software package.

2. The system of claim 1, wherein the version control system repository is downloaded by the client device.

3. The system of claim 1, wherein the request is a first request and the memory device further comprises instructions executable by the processing device for causing the processing device to perform operations comprising:
receiving, from the client device, a second request for the version of the software package associated with the software build at the particular time; and
providing, for the client device, at least one modification log of the plurality of modification logs associated with the particular time and with the software package, the at least one modification log usable by the client device to produce the version of the software package.

4. The system of claim 1, wherein the memory device further includes instructions executable by the processing device for causing the processing device to perform operations comprising:
generating, based on the at least one modification log, the software build having characteristics of the metadata at the particular time; and
providing, for use by the client device, the software build.

5. The system of claim 1, wherein each modification log of the plurality of modification logs includes a timestamp and wherein the memory device further includes instructions executable by the processing device for causing the processing device to perform operations comprising:
determining, based on the timestamp of each modification log, the at least one modification log associated with the particular time.

6. A method comprising:
recording a plurality of modification logs, each modification log of the plurality of modification logs associated with a modification to metadata for a software repository;
storing, in a version control system repository, the plurality of modification logs;
receiving, from a client device, a request for the metadata for the software repository at a particular time;
providing access, for the client device, to at least one modification log of the plurality of modification logs associated with the particular time, the at least one modification log usable by the client device to produce a software build having characteristics of the metadata at the particular time;
storing, in a software package file repository, a plurality of software package files associated with the software build, each software package file of the plurality of software package files comprising a timeframe corresponding to deployment of a software package including the software package file in the software build; and
providing access for the client device to the software package file repository, the software package file repository usable by the client device to determine a version of the software package at the particular time based on the timeframe for each software package file and usable by the client device to download the version of the software package.

7. The method of claim 6, wherein the version control system repository is downloaded by the client device.

8. The method of claim 6, wherein the request is a first request, and wherein the method further comprises:
receiving, from the client device, a second request for the version of the software package associated with the software build at the particular time; and
providing, for the client device, at least one modification log of the plurality of modification logs associated with the particular time and with the software package, the at least one modification log usable by the client device to produce the version of the software package.

9. The method of claim 6, further comprising:
generating, based on the at least one modification log, the software build having characteristics of the metadata at the particular time; and
providing, for use by the client device, the software build.

10. The method of claim 6, wherein each modification log of the plurality of modification logs further comprises a timestamp and wherein the method further comprises:
determining, based on the timestamp of each modification log, the at least one modification log associated with the particular time.

11. A non-transitory computer-readable medium comprising instructions that are executable by a processing device for causing the processing device to perform operations comprising:
recording a plurality of modification logs, each modification log of the plurality of modification logs associated with a modification to metadata for a software repository;
storing, in a version control system repository, the plurality of modification logs;
receiving, from a client device, a request for the metadata for the software repository at a particular time; and
providing access, for the client device, to at least one modification log of the plurality of modification logs associated with the particular time, the at least one modification log usable by the client device to produce a software build having characteristics of the metadata at the particular time;

storing, in a software package file repository, a plurality of software package files associated with the software build, each software package file of the plurality of software package files comprising a timeframe corresponding to deployment of a software package including the software package file in the software build; and providing access for the client device to the software package file repository, the software package file repository usable by the client device to determine a version of the software package at the particular time based on the timeframe for each software package file and usable by the client device to download the version of the software package.

12. The non-transitory computer-readable medium of claim 11, wherein the version control system repository is downloaded by the client device.

13. The non-transitory computer-readable medium of claim 11, wherein the request is a first request, and further comprising instructions executable by the processing device for causing the processing device to perform operations comprising:

receiving, from the client device, a second request for the version of the software package associated with the software build at the particular time; and providing, for the client device, at least one modification log of the plurality of modification logs associated with the particular time and with the software package, the at least one modification log usable by the client device to produce the version of the software package.

14. The non-transitory computer-readable medium of claim 11, further comprising instructions executable by the processing device for causing the processing device to perform operations comprising:

generating, based on the at least one modification log, the software build having characteristics of the metadata at the particular time; and providing, for use by the client device, the software build.

* * * * *